July 16, 1946.                    H. BOUCKE                    2,404,160
                            ELECTRIC CONTROL SYSTEM
                            Filed June 14, 1939            2 Sheets-Sheet 1

INVENTOR.
HEINZ BOUCKE

BY

ATTORNEY.

July 16, 1946.  H. BOUCKE  2,404,160
ELECTRIC CONTROL SYSTEM
Filed June 14, 1939  2 Sheets-Sheet 2

INVENTOR.
HEINZ BOUCKE
BY
ATTORNEY.

Patented July 16, 1946

2,404,160

UNITED STATES PATENT OFFICE 2,404,160

ELECTRIC CONTROL SYSTEM

Heinz Boucke, Berlin-Charlottenburg 2, Germany, assignor, by mesne assignments, to Patents Research Corporation, New York, N. Y., a corporation of New York Application June 14, 1939, Serial No. 278,993
In Germany June 25, 1938

11 Claims. (Cl. 179—171)

The present invention relates to improvements in electric control systems and methods of operating the same, more particularly to arrangements employed in amplifiers for oscillatory signal energy which may be of low, medium and high frequency for controlling a characteristic of the output energy in dependence upon variations of the same or a different characteristic of the input energy to be amplified. Control systems of this type serve various uses especially to improve the efficiency and/or quality of the reproduction of sound or other oscillatory signal energy.

The most frequent use of control arrangements of the above type in both high frequency and low frequency amplifiers is in the form of automatic gain or volume control (AVC) involving the employment of a controlling potential obtained by rectifying and averaging a portion of the signal energy to be amplified.

Automatic gain control systems serving to regulate the output volume in dependence upon variations of input signal strength and other arrangements of this nature, such as automatic frequency control, band width control arrangements in radio receivers, volume contraction and volume expansion systems in transmitters, receivers and amplifiers and various other control arrangements, generally involve the use of a control potential or current obtained by averaging a portion of the signal energy being amplified such as by rectification and subsequent filtering. The speed of the regulating action in arrangements of this type is determined by the time constant of the filter employed for smoothing or steadying the rectified potential.

It has already been proposed heretofore to employ a plurality of control potentials acting with different speeds or time constants to produce certain desirable effects and advantages. Thus it has been suggested to reduce the effect of short interfering impulses by momentarily reducing the amplification in a receiver equipped with automatic volume control by the aid of an additional control potential acting with reduced time delay.

It is an object of the present invention to provide means for and a method of time constant control in a regulating arrangement of the above general character whereby a desired variation or modification of the characteristics of the output energy in an amplifier is obtained in a most efficient and easy manner.

A more specific object is to control the time constant of the smoothing filter in a regulating channel transmitting a controlling potential or current to an element adapted to vary the transmission characteristics of an amplifier directly and in proportion to changes of a charactertistic of the oscillatory energy to be amplified.

A further object is to control the time constant of the smoothing filter in a regulating channel serving to transmit a gain control potential in an amplifier directly in dependence upon the amplitude of the signals being amplified.

Still a further object is to control the time constant of the filter in the regulating channel transmitting an automatic volume control potential in an amplifier directly in proportion to the degree or range of the automatic volume control.

Another object is to control the time constant of the smoothing filter in the regulating channel for transmitting a volume control potential in an amplifier directly in proportion to the amplitude ratio of different frequency or groups of frequency components of the oscillatory signal energy to be amplified.

A further object is to control the time constant of the smoothing filter in the regulating channel for transmitting a volume control potential in an amplifier directly in proportion to the speed or rate of change of the amplitude of the input signal energy applied to the amplifier.

Still another object is to control the time constant of the filter in the regulating channel for transmitting an atuomatic gain control potential in an audio frequency amplifier directly in dependence upon the adjustment of a frequency discriminating network adapted to modify the quality of the sounds produced in a translating device energized by the amplifier output.

A further object is to control the time constant of the filter in the regulating channel for transmitting an automatic frequency control potential in a radio receiver equipped with an automatic tuning arrangement, or in other words to control the speed or quickness of action of the frequency control directly in dependence upon the strength of the radio signals being received.

Still a further object is to control the time constant of the filter in the regulating channel for transmitting a potential or current in an audio frequency amplifier adapted to compress or expand the dynamic or intensity range of the audio signals being amplified directly in dependence upon the average signal amplitude.

With the foregoing and other objects which will become apparent as the following description proceeds, in view the invention contemplates the provision of means to render the time to establish a control effect upon changes of a variable characteristic of the amplifier or of the energy being amplified, or any other cause, hereinafter referred to as "attack" time and/or the time to remove the control effect after cessation of the cause, hereinafter called "recovery" time directly dependent upon the same or another characteristic of the amplifier or the energy to be amplified, by automatically adjusting an element of the filter or smoothing network arranged in the channel transmitting the control potential.

The invention both as regards its design and arrangement of circuit elements as well as function and operation will become more apparent from the following detailed description taken with reference to the accompanying drawings forming part of this specification and wherein:

Figure 1 shows for the sake of illustration a well known rectifier and filter circuit for producing a control potential by averaging a portion of the signal energy to be controlled, Figure 2 illustrates one way of controlling the time constant or speed of the controlling action in a purely electrical manner proposed by the invention, Figure 3 shows a filter circuit suited for use in a low frequency such as an audio amplifier for obtaining volume compression or expansion with the time constant or speed of the control action depending upon the degree or range of gain control, Figure 4 illustrates an exemplification of a variable speed gain control in dependence upon the rate of change of the input signal amplitude applied to an amplifier, Figures 4A and 4B illustrate further exemplifications of variable gain control systems embodying the principles of the invention.

Like reference characters identify like elements throughout the different views of the drawings.

Figure 1:
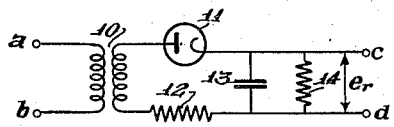

Referring more particularly to Figure 1, there is shown a combined rectifier and filter circuit of well known construction for producing a control potential from a portion of the main signal energy to be amplified or translated. The energy extracted from the main signal circuit such as a receiver or amplifier is applied by way of input terminals $a$—$b$ and a coupling transformer 10 to a rectifier such as a diode rectifier 11 connected across the transformer secondary in series with an impedance 12 and a condenser 13. A further impedance 14 is shunted across the condenser 13. The control or regulating potential $e_r$ is derived from the opposite ends of the impedance 14 and serves to influence a regulating device by way of the output terminals $c$—$d$ such as an element adapted to control the amplifying gain, the band width, tuning adjustment, or any other characteristic of the receiver or amplifier in a manner well known in the art.

The filter for smoothing the control potential $e_r$ comprises in general a smoothing condenser 13 in series with a charging impedance 12 and a discharge impedance 14 in parallel or shunted across the condenser as shown in the example illustrated, but may be of more complex construction as will be understood. The charging impedance may be constituted partly or entirely by the internal impedance of the current source; that is, in the example shown the impedance of the secondary winding of the transformer 10 or by the impedance of the rectifier 11. The charging and discharge impedances preferably although not limitatively consist of ohmic resistors. They may be entirely or in part inductive reactances. The charging resistance in conjunction with the discharge resistance determines essentially the attack time of the regulation while the recovery time is essentially determined by the size of the discharge resistance and the smoothing condenser.

The variation of the time constant of the filter is effected according to the invention by varying the impedance values of one or more of the elements 12, 13 and 14, thus involving the variation of one or more capacity, resistance and/or inductance elements. For this purpose any one of the known devices may be employed such as arrangements for step-by-step variation of a capacity, a resister, or inductance element by means of suitable switching arrangements or by gradual adjustment of one or more of these values in any suitable manner. A gradual adjustment may be effected by mechanical or electrical means such as by the employment of electronic valves serving as variable impedances or by means of a magnetic reactor provided with an auxiliary magnetization circuit.

According to the improvements of the present invention the control of the filter time constant or the speed of the control action in arrangements of the aforementioned character is effected automatically and in dependence upon a variable characteristic or adjusting operation in the receiver or amplifier. In case that the control of the time constant of the filter in the regulating channel causes a variation of the average value of the control potential, suitable compensating means may be employed to eliminate this defect partly or entirely.

Figure 2:
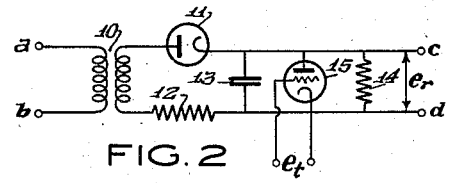

In Figure 2 there is shown a way of electric control of the time constant of the filter or the speed of action of a control potential $e_r$ transmitted through the filter in proportion to another auxiliary control potential $e_t$. There is provided for this purpose a vacuum tube 15 such as a triode or a tube of any other suitable construction serving as a variable impedance shunted across the output or discharge resistance 14. The impedance of the tube is varied in accordance with the controlling potential $e_t$ applied to the grid or other control element in a manner well understood, resulting in a variation of the tube impedance and in turn of the recovery time constant of the filter. In a similar manner the resistance 12 may be controlled to adjust the attack time constant or the speed with which the control effect is established. Other variable impedances suited for electrical or mechanical control may be used for the purpose of the invention in place of the valve 15 as is readily understood.

In the following there will be described several exemplifications illustrating the effects and advantages of a time constant control as proposed by the invention.

According to one embodiment, the time constant may be automatically controlled in dependence upon the degree or range of automatic regulation in an amplifier especially for controlling the intensity range of the amplification such as for volume compression and expansion. As is known, in arrangements of this latter type the attack and the recovery time constants are chosen by a compromise on the basis of the fact that if the time constants are too low non-linear distortion will result, while with time constants being too high dynamic distortion will occur in the output signal of the amplifier. The non-linear distortions increase with increasing degree of regulation. Inasmuch as the degree of regulation is usually not fixed, but may be chosen by operating an adjusting knob or the like, it is proposed to decrease one or both time constants of the filter in the regulating channel automatically with the decrease of the degree of regulation. In this manner a desired minimum of both distortion and time delay of the regulating action is ensured for the different ranges or degrees of regulation.

Figure 3:
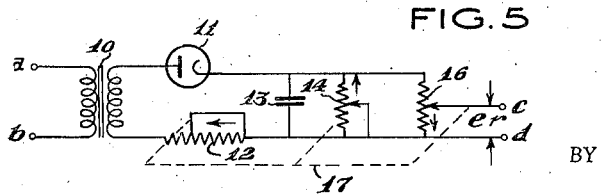

An arrangement of this type is illustrated by the circuit diagram according to Figure 3. In the latter, the smoothing impedances 12 and 14 are constituted by variable resistors, preferably of the rotary or any other suitable type arranged for uni-control by means of a single operating element or knob indicated at 17, whereby both resistances may be increased or decreased simultaneously thereby correspondingly varying the attack and recovery time, respectively, for the control potential. In the example shown, the common operating element (17) is extended to simultaneously adjust an element for controlling the degree of regulation such as a potentiometer 16 connected across the output terminals and serving to control the magnitude of the control potential $e_r$ and in turn the degree or range of the automatic gain control. In this manner the speed of regulation is automatically varied in direct proportion to the degree or range of the regulating action.

In certain cases it may be advantageous to increase the time constants or to decrease the speed of the regulating action with increasing degree or range of regulation in the interest of a better filtering action and in view of the fact that for small degrees of regulation the dynamic delay is less disturbing than with the higher regulating degrees.

If the degree of regulation is varied by a step switch, the resistors 12 and 14 may be constructed and adapted thereto in a manner well understood.

According to another embodiment, the time constant may be varied in dependence upon the average volume of the signal being received or amplified. Thus, if the average signal strength is high, the inherent distortion of the amplifier will be high also in which case it is recommendable to increase the time constant for the regulation in order to prevent a further increase of the over-all distortion. The control of the time constant or smoothing action in dependence upon the average signal strength may be effected for instance by varying one or more of the filter elements, in particular the charging and/or discharge resistance automatically together with the adjustment of a volume control regulator in a desired sense. An arrangement of this type may be derived from Figure 3 by replacing the potential divider 16 by the usual variable volume control resistor employed in amplifiers such as in radio receivers and similar amplifier systems.

Another exemplification of the invention consists in varying the attack and/or recovery time in systems for automatic volume compression and expansion in dependence upon the relative amplitude of different frequencies or groups of frequencies of the oscillatory signal energy to be amplified. Thus, it has been found advantageous to operatively connect the variable resistors for influencing the charging and discharging periods such as shown in Figure 2 with a tone control device in such a manner as to increase the filtering action or decrease the speed of the control with increasing relative strength of the lower sound frequencies. This dependence may also be accomplished in a purely electrical manner as is understood from the above.

According to a further feature of the invention, the time constant is rendered dependent upon the frequency distribution of the audio or other low frequency signal to be amplified by dividing the signal band into two groups, one group comprising the lower frequencies and the other group comprising the medium and high frequencies. Separate regulating potentials are produced from each frequency group and combined in opposition to produce a differential control potential. The latter will be equal to zero if both groups of frequencies are of substantially equal amplitude and will assume increasing negative or positive values depending on which of the group of lower and higher frequencies predominate over the other. By the aid of the thus obtained auxiliary control potential $(e_t)$ which, if desirable, may be converted into a control current, the time constant of the control potential proper $(e_r)$ is then regulated by varying the magnitude of the charging and/or discharge resistance in any of the above described manners. Thus, the control according to Figure 2 may be effected by shunting an electron valve across the discharge resistance and controlling the grid of the valve by the auxiliary $(e_t)$ potential obtained in the manner described above.

Figure 4A:
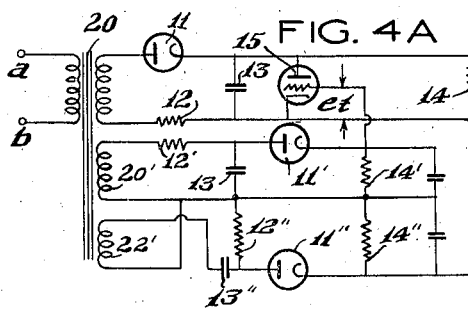

An arrangement of the latter type is shown in Fig. 4A, wherein separate energy portions are derived from the secondaries 20' and 22' of transformer 20 and applied to diode rectifiers 11' and 11'' by way of a low-pass filter 12', 13' and a high-pass filter 12'', 13'', respectively. The rectified potentials developed by the diode load resistors 14' and 14'' are combined differentially to produce a control potential $e_t$. The latter is applied to the grid of tube 15 for varying the time constant of the filter 12, 13, 14 for the gain control potential $e_r$ to obtain a variably delayed controlling action dependent upon the amplitude ratio between the low and high frequency components of the signal energy being amplified.

The variation of the discharge resistance in the above described manner may entail a variation of the absolute magnitude of the control potential and in turn a change of the degree of regulation; that is, the latter will become less if the recovery time is decreased. Since, however, in general the recovery time in automatic volume compression and expansion systems is chosen substantially higher than the attack time—about 30 to 100 times the former—the discharge resistance will be about 30 to 100 times greater than the charging resistance whereby even with the recovery time being reduced to a minimum of ¼ of its normal value, the total potential will vary only about 10 to 20%. The effect on the magnitude of the control potential may also be eliminated by simultaneously decreasing the discharge resistance and/or the resistance of the rectifier by shunting a variable resistance across the latter or in any other suitable manner.

Figure 4B:
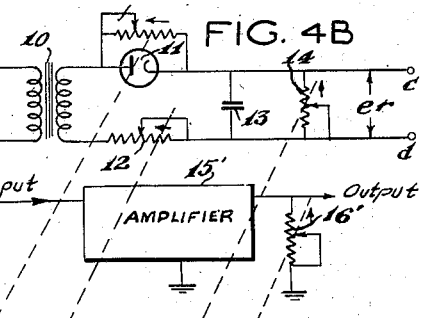

In Fig. 4B, there is shown a system of this type for varying the time constant of a control potential in dependence upon the average volume of the signal energy being transmitted or amplified. There is shown in block diagram form an amplifier 15' of a radio receiver or the like embodying a volume control resistor 16' of well known design and a common operating member indicated at 17' for simultaneously adjusting the volume control, the discharge resistor 14 and the charging resistor 12 of a smoothing filter in the circuit producing the control or regulating potential $e_r$.

In addition, means are shown in Fig. 4B to compensate for the effect of the discharge resistor 14 on the amplitude of the control potential $e_r$ by the provision of a further variable resistor 18' shunting the rectifier 11 and arranged for unicontrol with the remaining resistors as shown. In an arrangement of this type, the time constant of the filter 12, 13, 14 is decreased as the volume is decreased and vice versa. Furthermore, the arrangement is such, as indicated by the arrows, that the current shunted around the rectifier 11 decreases as the discharge resistor 14 and, in turn, the control potential $e_r$ are decreased. Accordingly, the rectifier output current will be increased, resulting in increased potential drop across resistor 14 and compensation of the decrease of the control potential $e_r$.

According to another embodiment of the invention the time constant for the regulating potential or current is varied in dependence upon the speed or rate of change of the intensity variations of human speech or a musical selection. In the latter case, slow intensity variations will cause a more efficient filtering resulting in a decrease of distortion. In order to carry out the desired control of the time constant or filtering in accordance with the rate of change of the amplitude variations a special auxiliary potential is required representative of this relation.

This auxiliary potential may be obtained by producing a regulating potential varying according to the intensity changes of the original sound or other signals and to derive from this potential a further potential by electrical differentiation which will thus vary according to the rate of change of the original regulating potential.

The auxiliary control potential may be utilized to control the time constants by controlling one or more electron valves in a manner understood from the above. The auxiliary control potential is applied to the discharge resistance preferably in such a manner that during the half waves corresponding to increasing intensity, the discharge resistance is reduced, while during the half waves corresponding to the periods of decreasing intensity a control of the charging resistance only takes place. This is accomplished by applying the respective portions of the auxiliary potentials to each of the regulating resistors by way of a rectifier suppressing the undesired half waves.

Figure 4:
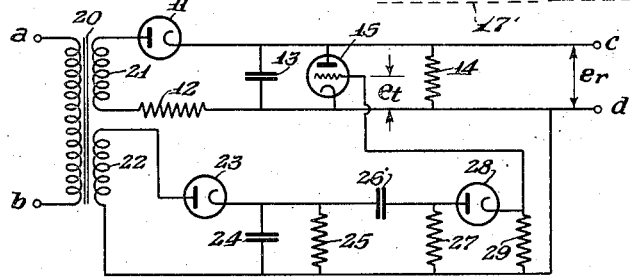

In Figure 4 of the drawings there is shown an example for influencing the recovery time constant by means of a control potential dependent upon the speed or rate of increase of the signal intensity. The regulating potential proper $e_r$ is produced in the same manner as shown in the previous illustrations by applying a portion of the signal energy such as sound currents to a rectifier and filter circuit 11 to 14 by way of input terminals $a$—$b$ and the secondary 21 of a transformer 20. The regulating tube 15 shunted across the discharge resistance 14 is controlled by the auxiliary control potential $e_t$ whose half waves corresponding to the periods of intensity increase are suppressed by a rectifier 28. The auxiliary control potential $e_t$ is produced by means of a second rectifier circuit comprising a tertiary winding 22 of the transformer 20, rectifier 23, smoothing condenser 24 and resistance 25 and having attack and recovery time constants which are lower than the time constants for the main control potential $e_r$. A condenser 26 and resistance 29 connected across the resistance 25 serve to produce the auxiliary control potential by electrical differentiation, i. e. a potential ($e_t$) varying according to the rate of change of the rectified and filtered potential, the former being impressed upon the rectifier 28 in series with coupling resistance 29 supplying the auxiliary grid control potential $e_t$ for the electronic resistance 15. If desired a fixed bias may be applied to the grid in a manner well known.

Still another application of the invention consists in the control of the time constant of a potential serving to effect automatic tuning in a radio receiver in dependence upon a control potential varying according to the signal strength which may be obtained in a manner similar as in automatic volume control systems. According to a preferred arrangement, this control is effected in such a manner that during strong fadings the time constant of the tuning control potential is increased to a considerable extent. In this manner the tuning will be maintained for a certain period although the transmitter may be blanketed by the noise level, and though a strong neighboring transmitter may tend to pull over the tuning adjustment due to the automatic tuning action. The filter for the regulating potential in this case is controlled by the control potential in such a manner that the time constants to establish and remove the control effect are increased during several seconds. This may be accomplished in an easy manner by the provision of high ohmic smoothing impedances shunted by electron valves serving as impedance elements in the manner described hereinabove. As a result, the tuning will be maintained constant during short and strong fading periods but will only be switched over to a neighboring transmitter in case of prolonged and strong drifts or fading periods.

The above described arrangement for producing a control potential dependent on the low (audio) frequency signal amplitude and control of the time constant depending upon the rate of change of the signal strength variations, may advantageously be used in a broadcast transmitter equipped with means for adjusting the carrier amplitude in proportion to the amplitude of the modulating (audio) signal to improve the transmission efficiency.

Figure 5:
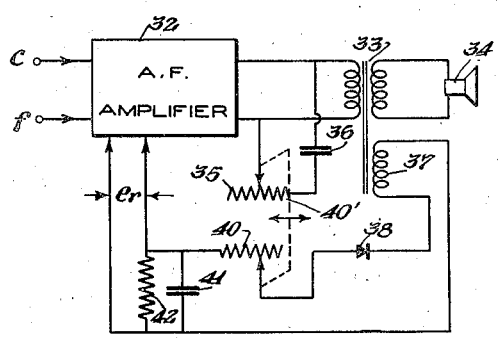
Figure 5 is a circuit diagram illustrating an exemplification for variable speed gain control in dependence upon the tone control adjustment in an amplifier.
Figure 6:
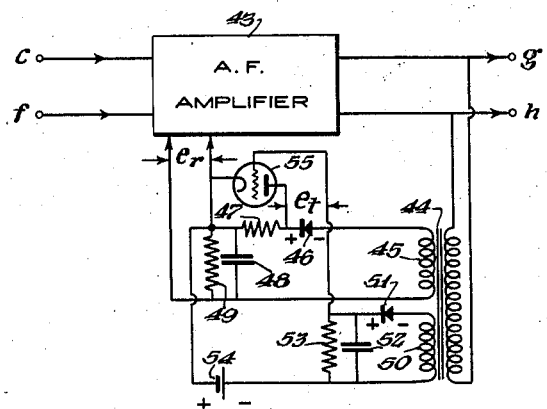
Figure 6 is a circuit diagram illustrating an arrangement for obtaining variably delayed automatic gain control depending upon the average amplitude or input signal strength applied to an amplifier.
Figure 7:
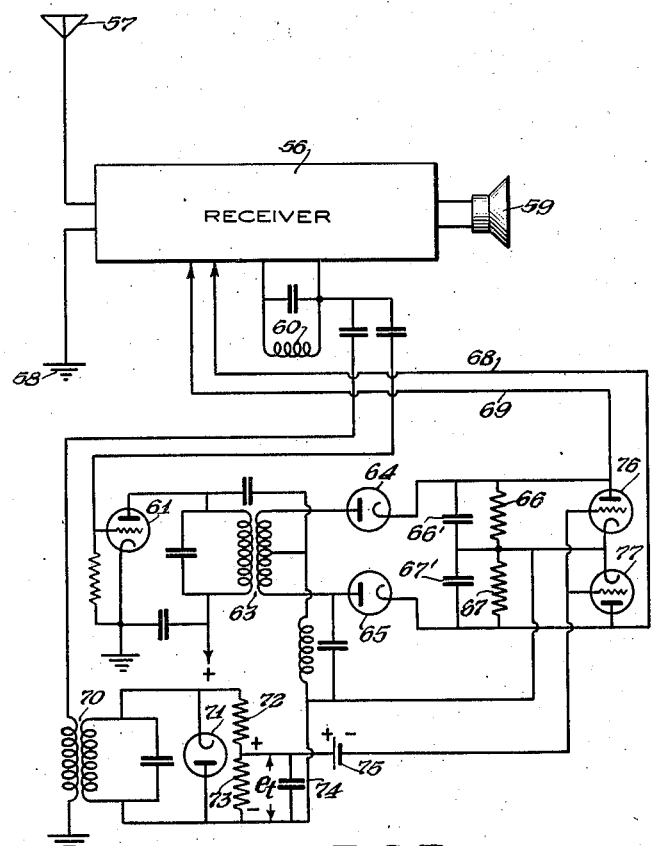
Figure 7 shows a circuit diagram for a radio receiver illustrating a variably delayed automatic frequency control depending upon the strength of a received radio signal.

In Figures 5 to 7 there are shown specific practical applications of the invention described in the following.

Figure 5 shows an arrangement for controlling the time constant for a gain control potential in dependence upon the adjustment of a tone control device in an audio frequency amplifier. The signal currents obtained from any source, such as a radio receiver, microphone, pick-up device, etc., are applied to the amplifier 32 by way of the input terminals $c$—$f$. The output of the amplifier serves to energize a translating device such as a loud speaker 34 by way of a coupling transformer 33. The primary winding of the transformer 33 is shunted by a tone control circuit comprising in a known manner a variable resistor 35 and a condenser 36 in series and serving to adjust the relative amplitudes of the low and high audio frequencies resulting in a variation of the quality of the reproduction in a manner well understood. A portion of the audio signal energy is extracted by means of a tertiary winding 37 of the transformer 33 and averaged by means of rectifier 38 and smoothing filter comprising a variable charging resistor 40, charging condenser 41, and discharge resistor 42, to produce a control potential $e_r$ impressed upon a gain control element of the amplifier 32 in a manner well understood from the above. The tone control resistor 35 and the smoothing resistor 40 are arranged for uni-control by the aid of a common operating element indicated at 40' such as by the employment of resistors of the rotary type mounted upon a common shaft. In this manner both resistors are simultaneously varied in the direction of or opposite to the arrows as indicated, in such a manner that with the adjustment of the tone control for accentuation of the low signal notes the attack time is increased, as is permissible for the low signal frequencies, resulting in an improved smoothing action and in turn in increased freedom from distortions.

Referring to Figure 6 illustrating a system for time constant control in an amplifier with automatic volume compression, the audio frequency input is applied to the amplifier 43 by way of input terminals c—f and the amplified signal energy applied to a translation device such as a cutting device for phonograph recording connected to the output terminals g—h. A portion of the output energy is a applied to the primary of a transformer 44 having two secondary windings 45 and 50. The secondary 45 serves to energize a rectifier 46 and filter comprising charging resistor 47, smoothing condenser 48, and discharge resistor 49 to produce a control potential $e_r$ applied to a gain control element of the amplifier 43 for compression of the signal intensity range, in a manner well known in the art. There is further shown an electron tube impedance 55 shunted across the charging resistance 47 and serving to control the charging period of the smoothing condenser 48. For this purpose the grid of the valve 55 is controlled by an auxiliary potential $e_t$ varying according to the average signal strength and produced by means of a rectifier 51, smoothing condenser 52 and discharge resistance 53 energized by the secondary winding 50 of the transformer 44. A source of potential 54 such as a dry battery or the equivalent serves to provide a fixed bias for the tube 55, whereby a reduction of the tube resistance is started after the signal amplitude exceeds a predetermined value. In this manner it is possible to reduce the attack time for the compression control with increasing signal strength, in particular when a predetermined signal strength is reached which may be chosen by suitably proportioning the circuit elements.

Referring to Figure 7, there is shown an exemplification of the invention embodied in a system for automatic frequency control commonly used in radio receivers. The rectangle 56 collectively indicates a receiver preferably of the superheterodyne type having its input excited by an antenna circuit comprising an antenna 57 and ground connection 58 and having its output connected to a translating device such as an image receiver or loud speaker 59 as shown in the drawings. The receiver is equipped with a system for automatic frequency control known per se and indicated in the drawings only to an extent as is deemed necessary for an understanding of the invention.

A portion of the intermediate frequency energy extracted from the tuned circuit 60 is applied to the grid of an amplifier valve 61 and the amplified signal energy impressed upon the tuned output transformer 63. The opposite ends of the secondary winding of the latter are connected each to one terminal of a rectifier such as diode rectifiers 64 and 65, respectively, the remaining terminals of the rectifier being connected through a pair of equal resistances 66 and 67 in series and shunted by smoothing condensers 66' and 67', respectively. The center tap of the secondary winding 63 is coupled on the one hand to the high potential end of the primary winding and to the junction of the resistors 66 and 67 through a high frequency choke coil on the other hand, whereby in a known manner the sum and the difference of the primary and secondary potentials of the transformer 63 are rectified and combined in opposition producing a differential potential between the outer ends of the resistances 66 and 67 which potential varies directly in proportion to and depending on the sense of detuning of the transformer 63 relative to the impressed signal frequency. This tuning control potential is then applied by way of circuit connections 68 and 69 to a reactance control element of the receiver 56 such as the local or heterodyne oscillator suited to effect a tuning control in such a manner as to automatically adjust the intermediate signal frequency to coincide with the center resonance frequency of the intermediate frequency amplifier of the receiver.

According to the present improvements there are provided a pair of variable impedances in the form of electronic tubes 76, 77 shunted across the resistors 66 and 67, respectively, and serving for automatic control of the time constant for the frequency control potential in dependence upon the carrier amplitude or average strength of the radio signals being received. For this purpose the grids of the valves 76 and 77 are simultaneously controlled by a potential $e_t$ produced by applying another portion of intermediate frequency energy extracted from the circuit 60 by way of transformer 70 to a rectifying circuit comprising rectifier 71 shunted by smoothing resistances 72 and 73 in series. The control potential $e_t$ is derived from the ends of the resistance 73 shunted by a smoothing condenser 74, while a further fixed bias is applied to the grids of the tubes 76 provided by a suitable source such as a battery 75 and acting in opposition to the rectified potential drop developed across the smoothing resistance 73.

In an arrangement of the aforedescribed type the regulating time constant for the automatic frequency adjustment will be normal as long as the signal strength remains within a predetermined limit, in that the fixed negative grid bias for the valves 76 and 77 provided by the battery 75 is compensated by the potential drop across resistance 73. If the signal strength decreases below this limit the valves 76 and 77 will be blocked by the negative bias 75, whereby the discharge of the condensers 66' and 67' takes place through the resistances 66 and 67 only in such a manner that with proper design of the circuit the potential at the condensers 66' and 67' will retain its value for a certain period. Thus, during rapid fading periods the receiver will be in the exact tuning adjustment when the signal strength again begins to rise. In other words, the speed of the automatic frequency control (AFC) action is varied in direct proportion to the variations of the strength of the signals being received.

It will be evident from the above that the invention is not limited to the specific circuits and arrangements of parts and methods disclosed herein for illustration but that the underlying idea and principle of the invention are susceptible of numerous modifications and variations coming within its broader scope and spirit as defined by the appended claims. The specification and drawings are to be regarded accordingly in an illustrative rather than in a limiting sense.

I claim:

1. In a translation system for oscillatory signal energy, means for producing an auxiliary potential by extracting and averaging a portion of the energy being translated, means to utilize said auxiliary potential to automatically control a condition of the energy being translated, and further means for automatically varying the speed of control of said auxiliary potential in direct dependence upon variations of a different condition of the energy being translated.

2. In a translation system for oscillatory signal energy including an amplifier, means comprising rectifying and filter means for producing an auxiliary potential by extracting and averaging a portion of the energy being translated, said filter means comprising a network of impedance elements, means to utilize said auxiliary potential for controlling the gain of said amplifier, means for producing a further auxiliary potential varying in proportion to variations of a different condition of the energy being amplified, and means to utilize said further auxiliary potential for controlling the magnitude of at least one of the impedance elements of said filter means.

3. In a translation system for oscillatory signal energy including an amplifier, means comprising rectifying and filter means for producing an auxiliary potential by extracting and averaging a portion of the energy being translated, said filter means comprising a network of impedance elements, an electronic device operatively connected with at least one of said impedance elements, means to utilize said auxiliary potential for controlling the gain of said amplifier, means for producing a further auxiliary potential varying in proportion to variations of a different condition of the energy being amplified, and further means to control the impedance of said electronic device in accordance with said further auxiliary potential, to vary the time constant of said filter means in dependence upon variations of said condition.

4. In a system as claimed in claim 3, wherein said further auxiliary potential varies with the rate of change of the signal amplitude variations, whereby the speed of the gain control is varied in direct proportion to the rate of change of the signal amplitude variations.

5. In a system as claimed in claim 3, wherein said further auxiliary potential varies according to the relative amplitudes of high and low frequency components of the energy being translated, whereby the speed of gain control is decreased with increasing relative strength of the low frequency components.

6. In an audio frequency amplifier comprising automatic gain control means to effect compression of the intensity range of the amplified audio signals, filter means in the gain control circuit, means for producing an auxiliary potential varying in accordance with the average signal amplitude, further means for controlling the time constant of said filter means by said auxiliary potential, whereby the time constant is decreased as the signal strength is increased, and delay means to limit the control of the time constant of said filter to signal amplitudes in excess of a predetermined minimum level.

7. In an audio frequency amplifier comprising automatic gain control means for compressing the intensity range of the amplified audio signals, filter means in the gain control circuit comprising impedance elements and an electron discharge device operatively connected with at least one of said impedance elements, means to provide a fixed bias for said electron device, means for producing an auxiliary potential varying in proportion to the average signal amplitude, and means to apply additional variable bias to said electron device by said auxiliary potential to control the time constant of said filter means, said fixed bias being of such polarity and magnitude that the time constant is decreased when the signal amplitude increases beyond a predetermined minimum level.

8. In an amplifier for oscillatory signal energy, the steps of controlling a condition of the amplified energy in accordance with a characteristic of the energy to be amplified, and automatically varying the speed of control in direct accordance with variations of a different characteristic of said energy.

9. In combination with a range controller in a signal wave transmission circuit subject to interfering noise waves of relatively short period compared to the signal waves, or to selective signal fading conditions, said range controller including a variable gain amplifier in said circuit and a control circuit including a variable impedance, for automatically adjusting the gain of said amplifier to make the amplitude range of the signals in its output a desired function of the signal amplitude range in its input, means to improve the operation of said range controller comprising means for automatically varying the value of said variable impedance to adjust the time constant of said control circuit in accordance with the rate of variation of the waves applied to the input of said amplifier.

10. In a transmission system, a rectifier energized from said system to produce a control voltage, means for controlling a transmission characteristic of said system in accordance with said control voltage, a filter connecting said rectifier to said control means for partially smoothing out variations in said control voltage, means for adjusting the time constant of the filter, and said adjusting means being automatically actuated in dependence on a different characteristic of signals emanating from said system.

11. In a transmission system, a rectifier energized from said system to produce a control voltage, means for controlling a transmission characteristic of said system in accordance with said control voltage, a filter connecting said rectifier to said control means for partially smoothing out variations in said control voltage, and means operating automatically in dependence on variations in a different characteristic of signals in said system for adjusting the filter time constant.

HEINZ BOUCKE.